J. DE MARTINO.
STEERING WHEEL LOCK.
APPLICATION FILED DEC. 26, 1919.
1,366,066.
Patented Jan. 18, 1921.
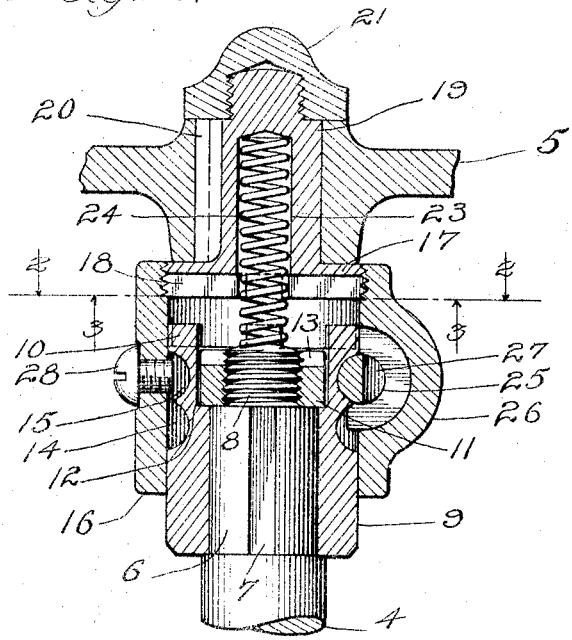
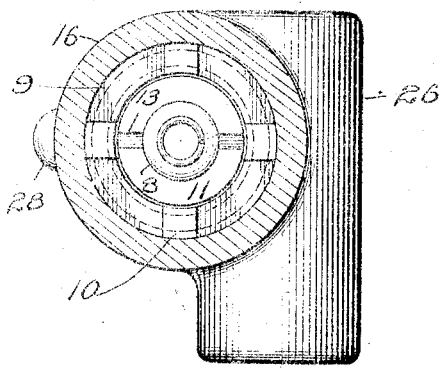
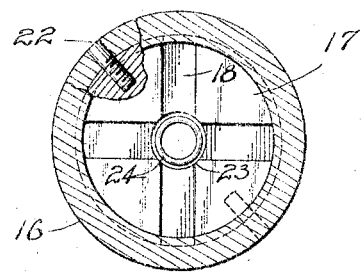
Witness:
Inventor,
Joseph De Martino,
By Glenn S. Noble, Atty.

UNITED STATES PATENT OFFICE.

JOSEPH DE MARTINO, OF CHICAGO, ILLINOIS, ASSIGNOR TO SIMPLEX CORPORATION, OF CHICAGO, ILLINOIS, A CORPORATION OF ILLINOIS.

STEERING-WHEEL LOCK.

1,366,066. Specification of Letters Patent. Patented Jan. 18, 1921.

Application filed December 26, 1919. Serial No. 347,486.

*To all whom it may concern:*

Be it known that I, JOSEPH DE MARTINO, a subject of the King of Italy, residing at Chicago, in the county of Cook and State of Illinois, have invented certain new and useful Improvements in Steering-Wheel Locks, of which the following is a specification.

This invention relates to means whereby a steering wheel of a motor vehicle may be locked in operative relation to the steering shaft or tube, and may also be locked out of operative relation to the shaft or tube so that the vehicle can not be guided thereby. It is particularly applicable to automobiles having the steering wheel directly attached to the steering shaft, such for instance as the Dodge cars, although it is intended to be used wherever applicable. In this connection it will be noted that the steering member which is operated by the steering wheel is in some instances, a solid shaft, and in other instances a tube is used.

One of the principal objects of this invention is to provide a steering wheel locking device which not only locks the wheel in operative or inoperative position, but also locks itself so that it can not be readily removed from the steering shaft. Another object is to provide a simple and convenient locking device which may be economically manufactured and which will be attractive in appearance. Other objects will appear from the following description.

In the accompanying drawings illustrating this invention:

Figure 1 is a longitudinal sectional view showing the device as applied to a steering shaft and with the wheel locked in raised or inoperative position;

Fig. 2 is a sectional view taken on the line 2—2 of Fig. 1;

Fig. 3 is a sectional view as indicated by the arrows 3—3 on Fig. 1.

As illustrated in these drawings, 4 represents the steering shaft which is provided with any suitable means for securing the steering wheel 5 thereto. In the present instance the shaft has a reduced end or seat 6 which is provided with a key-way 7 for keying the wheel thereon and is also provided with a threaded end 8 for a nut. The wheel is removed and in place thereof I provide a sleeve or collar 9 having a central bore adapted to fit the end of the shaft and having a cylindrical outer surface. This sleeve has one or more lugs or projections 10 at the upper end thereof for engagement with an interlocking part which will presently be described. This sleeve is held in position by suitable keys and also by a nut 11 which engages with the threaded end 8 of the shaft 4. This nut is preferably round and fits in a recess 12 in the end of the sleeve and is provided with spanner slots 13. The sleeve 9 is also provided with two annular grooves 14 and 15.

A cap or cup shaped locking member 16 fits over the sleeve 9 and is longitudinally and rotatably movable thereon. This member is threaded at its upper end to receive a plug or head 17 which is provided with slots or recesses 18 for engagement with the lugs 10. This plug has a stem 19 which corresponds with the upper end of the shaft 4 and has a seat which is adapted to receive the steering wheel 5 which is held by means of a key 20 and nut 21. The plug 17 is securely fastened to the cap 16 by means of blind pins 22, or by soldering or brazing. It will be noted that the plug and cap 16 may be formed integrally, but for convenience in manufacture I prefer to make them separately. These parts form an extension for the shaft 4, and provide a duplicate seat for the steering wheel so that the ordinary wheel may be used without any change, but will be somewhat higher when applied to the extension than when in its original position on the shaft. The plug 17 has a center hole 23 for receiving a compression spring 24. This spring presses against the upper end of the shaft 4 and against the plug, and tends to hold the plug and parts attached thereto in normally raised position, as shown in Fig. 1, at which time the wheel is disconnected from operative relation with the steering shaft. It may be locked in this position by means of a locking bolt 25 which is mounted in a barrel or projection 26 on the cap 16 and which may be operated by means of any suitable locking mechanism (not shown). This bolt may engage with either of the grooves 14 or 15 and is cut away as shown at 27, so that when it is turned the cut away portion will register with the sleeve 9 to permit the longitudinal movement of the cap 16.

In order to prevent the accidental or unintentional removal of the cap, I provide a screw 28 which projects slightly through the cap into the grooves 14 and 15, the spandrel or projection between these grooves being slightly lower than the surface of the sleeve, so that the screw will not interfere with the limited movement of the cap.

With the parts arranged as shown in Fig. 1, the wheel 5 is free to spin without actuating the steering shaft. When the driver wishes to unlock the wheel he inserts a key in the lock and turns the bolt 25 until the slot 27 is opposite the sleeve and then presses down on the wheel until the lugs 10 engage with the slots 18 which brings the steering wheel into operative relation with the steering shaft. He then turns the key to bring the locking bolt 25 into engagement with the groove 14 which will hold the parts with the wheel in driving position. When he again wishes to lock the vehicle, he turns the bolt 25 to release the cap and the spring 24 will raise the cap and wheel to the original position where it may be again locked. It will be noted that when the cap is locked in either position, there is no way to get access to the nut 11 to remove the same and consequently the entire device is automatically locked on the steering shaft. From this description, it will be seen that I provide an extension for the steering shaft or post 4, with a duplicate seat or end for the steering wheel, and means for locking this extension so that it will turn the steering shaft or post or be disengaged therefrom, and I believe that I am the first to provide such an extension or arrangement whereby the same steering wheel may be used without being changed. It will of course be apparent that some fastening member other than the nut 11 may be used for fastening the sleeve on the shaft, and it will also be noted that various changes may be made in the details of construction in order to adapt the device to different automobiles or motor vehicles, and therefore I do not wish to be limited to the exact arrangement herein shown and described except as set forth in the following claims, in which I claim:

1. In a steering wheel lock, the combination of a sleeve for engagement with the upper end of the steering shaft and having one or more lugs at its upper end, a cap fitting over said sleeve and having recesses in the head thereof for receiving said projections, a stem on said cap for receiving the steering wheel, and means for locking the cap with the lugs either in engagement with said recesses or out of engagement therewith.

2. A locking device of the character set forth comprising a sleeve, means for fastening the sleeve on a steering post, a cap fitting over said sleeve, means for locking said cap in either raised or lowered position, interlocking members on the sleeve and cap which are adapted to interlock when the cap is in lowered position, and means for securing the steering wheel to the cap.

3. The combination of a collar for engagement with a steering shaft, means for fastening the collar to the shaft, said collar having two annular circumferential grooves, a cap fitting over said collar, a bolt in said cap for engagement with said grooves for locking the cap in raised or lowered position, clutch members on the cap and collar for engagement when the cap is in lowered position, and a stem on said cap for receiving the steering wheel said stem being a duplicate of the upper end of the steering shaft whereby the wheel may be secured thereto without being changed.

4. In a steering wheel lock, the combination of a collar for engagement with the steering shaft, a nut engaging with the shaft for holding the collar said collar having projections at its upper end and having annular grooves in its outer surface, a cylindrical member fitting over said collar and having a head in the upper end thereof said head being provided with means for engaging said projections, a bolt in said cylindrical member for engagement with said grooves, locking means for said bolt, a stem on said head, means for securing the steering wheel to the stem, a spring interposed between the head and the steering shaft tending to raise the head and parts connected thereto, and means for fastening the cylindrical member to the collar while permitting the necessary movement between these parts.

5. The combination with a steering shaft, of a collar at the upper end thereof said collar having annular grooves in its outer surface, a cylindrical cap-like member fitting over said collar and closed at its upper end, said member having slidable and rotatable movement on the collar, a locking bolt in said member adapted to engage with the respective grooves, an interlocking device for locking the member to the collar when in lowered position, means for fastening the steering wheel to said member, and resilient means tending to hold the member in raised position.

6. The combination with a steering shaft, of a collar at its upper end, a closed cap fitting over said collar, interlocking means between the cap and collar, a locking device for holding the cap in locked position or with the interlocking means disengaged, a lost motion connection between the cap and collar, and means for fastening a steering wheel to the cap.

JOSEPH DE MARTINO.